(No Model.) 2 Sheets—Sheet 1.

J. F. CUMMING.
TRICYCLE.

No. 305,053. Patented Sept. 16, 1884.

Witnesses:
N. E. Remick
L. J. White

Inventor:
John F. Cumming
Per C. C. Shaw
his Atty.

(No Model.) 2 Sheets—Sheet 2.
J. F. CUMMING.
TRICYCLE.
No. 305,053. Patented Sept. 16, 1884.
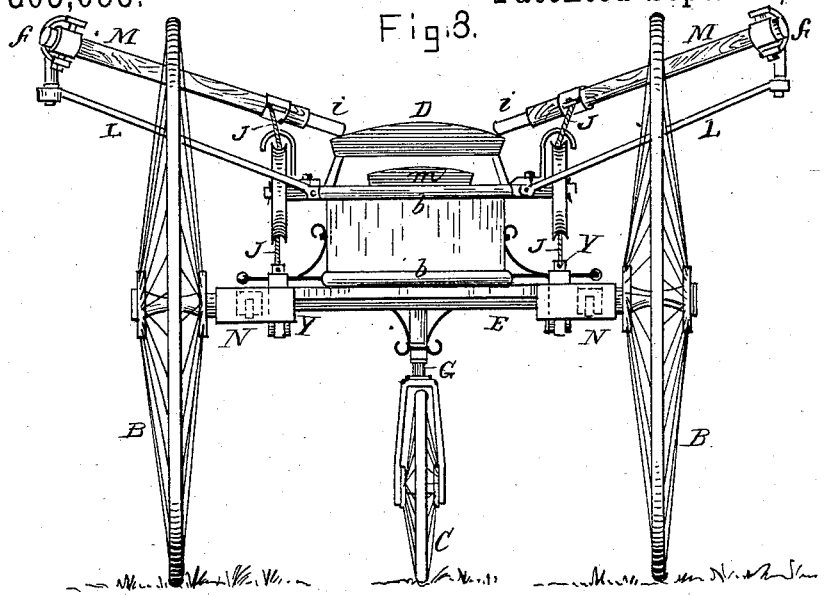
Fig. 3.
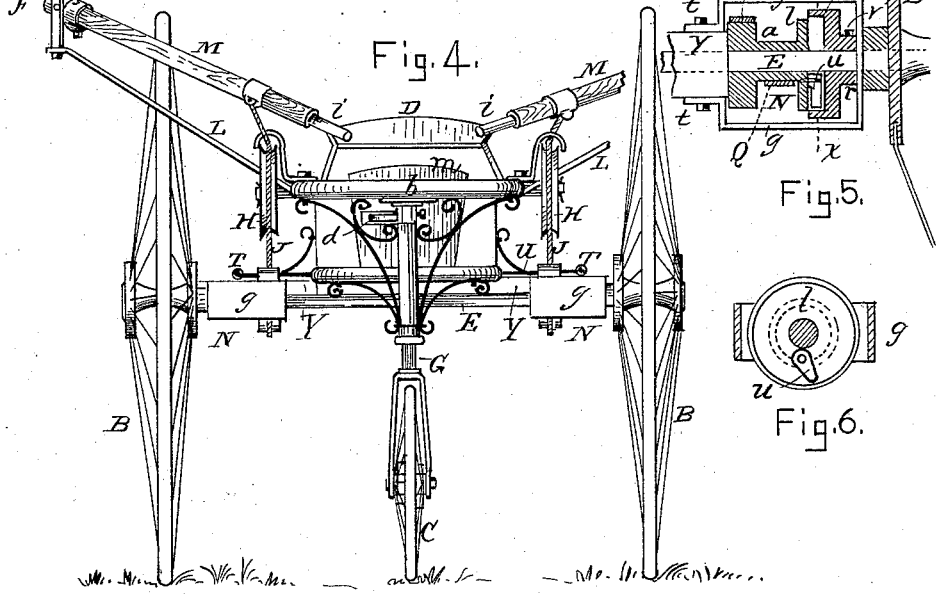
Fig. 4.
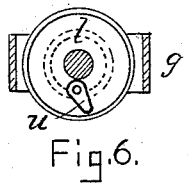
Fig. 5.
Fig. 6.
Witnesses:
K. E. Remick
L. J. White
Inventor:
John F. Cumming
Per C. C. Shaw, Atty.
N. PETERS, Photo-Lithographer, Washington, D. C.

UNITED STATES PATENT OFFICE.

JOHN F. CUMMING, OF BOSTON, MASSACHUSETTS.

TRICYCLE.

SPECIFICATION forming part of Letters Patent No. 305,053, dated September 16, 1884.

Application filed January 18, 1884. (No model.)

*To all whom it may concern:*

Be it known that I, JOHN F. CUMMING, of Boston, in the county of Suffolk, State of Massachusetts, have invented a certain new and useful Improvement in Tricycles, of which the following is a description sufficiently full, clear, and exact to enable any person skilled in the art or science to which said invention appertains to make and use the same, reference being had to the accompanying drawings, forming a part of this specification, in which—

Figure 1:
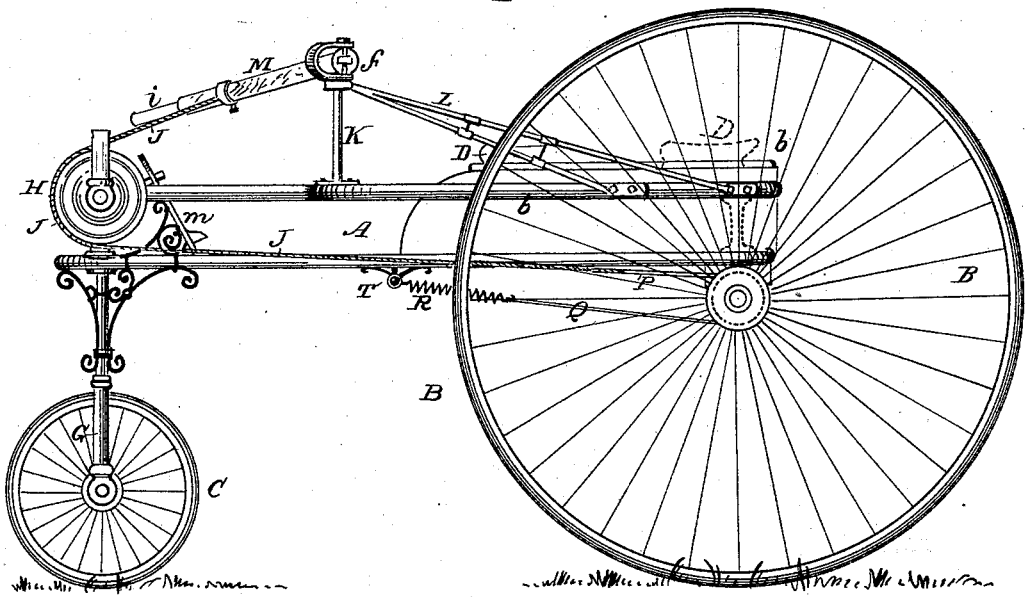
Figure 2:
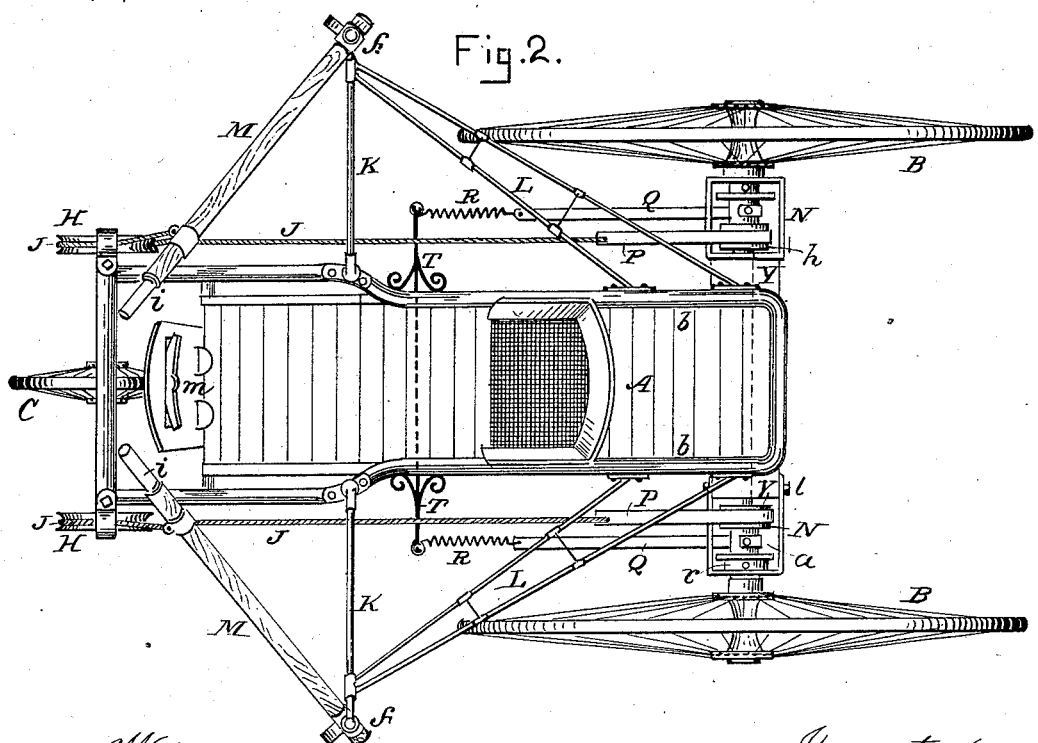

Figure 1 is a side elevation of my improved tricycle, a portion being shown in section; Fig. 2, a top plan view; Fig. 3, a rear elevation; Fig. 4, a front elevation; Fig. 5, a horizontal section, showing the clutch; and Fig. 6, a vertical transverse section of the same, taken on the line $x$ $x$ in Fig. 5.

Like letters and figures of reference indicate corresponding parts in the different figures of the drawings.

My invention relates to that class of tricycles which are propelled by hand-power, in contradistinction to those which are operated by pedals or propelled by the feet; and it consists in a novel construction and arrangement of the parts, as hereinafter more fully set forth and claimed, by which greater speed is attained and a more desirable article of this character produced than is now in ordinary use.

The nature and operation of the improvement will be readily understood by all conversant with such matters from the following explanation:

In the drawings, A represents the body, B the suspensory or driving wheels, C the pioneer or steering wheel, and D the seat. The driving-wheels have bracing and direct spokes, are provided with contractile rubber tires, and secured, respectively, to the outer end of the axle E in such a manner as to revolve with it. The wheel C has also bracing and direct spokes, a rubber tire, and is journaled in the bifurcated lower end of the vertical pintle G, which is fitted to turn in proper bearings, and is provided at its upper end with the arm or lever $d$ and a tiller or foot-bar, $m$, against which the feet of the rider are pressed to turn and control the wheel in steering the machine.

Journaled in proper bearings at the forward end of the body A there are two grooved wheels or sheaves, H H, under and partially around which the cords J are passed.

Projecting from either side of the body A forward of the seat D there is an outrigger, K, similar to the outrigger of a "shell" or boat, each outrigger being provided with a brace, L, extending to the rear of the carriage-body. A lever, M, is pivoted or jointed at its outer end to the outer end of each of the outriggers at $f$, the inner ends of the levers, near the hand-pieces $i$, being respectively secured to the forward ends of the cords J.

A clutch mechanism, N, is disposed near either end of the axle E, being inclosed by the rectangular brace $g$, in which the axle is journaled, the brace being bolted at $t$ to the bolster or axle-bar Y. This mechanism consists of a hollow sleeve, $a$, fitted to turn on the axle within said brace, and provided at one end with the solid boss or pulley $h$, and at the other with the annular flange $l$, to the outer face of which there is pivoted a pawl, $u$.

A collet, $r$, is secured by the screw $v$ to the axle E, between the sleeve $a$ and the outer end of the brace $g$. This collet is provided with a chambered boss, $p$, into which the flange $l$ extends, and in which the pawl $u$ works, the pawl impinging against the exterior walls of the chamber, as best seen in Fig. 6.

A band or belt, P, has its rear end attached to and wrapped around the pulley or boss $h$, and its forward end attached to the rear end of the cord J on either side of the body A. There is also on either side of the body a retrieving belt or band, Q, having its rear end attached to and wrapped around the sleeve $a$, between the pulley $h$ and flange $l$, and its forward end secured to the rear end of the coiled springs R, the forward ends of said springs being secured to brackets T, projecting from the body of the vehicle.

The seat D is fitted to slide on ways $b$, like the seat of a boat, and it will be observed that the levers M resemble in their construction, arrangement, and the functions they perform the oars of a boat.

The body of the vehicle is supported at its rear end by proper braces or irons, U, attached to the bolster or axle-bar Y, its forward end being supported by the pintle G and wheel C.

In the use of my improvement the rider takes his seat in the body of the vehicle, placing the feet against the tiller-bar m, the handles i of the levers M being firmly grasped in the hands. The levers are then pulled toward the rider, causing the cords J, drawn around the sheaves H, and the straps or belts P to be drawn forward toward said sheaves, at the same time winding up the straps Q on the sleeve a, the strap P passing over the pulley h and the strap Q under the sleeve a, so that when the strap P is drawn forward or unwound the strap Q will be drawn to the rear or wound up, and vice versa. When the straps P are drawn forward by pulling on the levers M, the pawls u engage the fixed collet r within the chambered boss p, thereby causing the axle E and wheels B to be turned forward, and when the levers are released the springs R, acting contractively, wind up the straps P on the bosses h preparatory to repeating the stroke, the pawl u dragging or running free in the chamber of the boss p as the sleeve a is turned back in winding up the strap P, but engaging said boss at each forward revolution of the sleeve, thereby acting to propel the vehicle in a manner which will be readily obvious without a more explicit description.

In constructing the various parts of the vehicle I make use, as far as possible, of metallic tubes, which may be silvered or nickel-plated to give it a highly ornamental appearance, and which combine the greatest degree of strength with minimum weight.

Instead of two clutches, one may be used, if desired, by placing it centrally on the axle and connecting it properly with the levers M, although I deem it preferable to employ two.

I do not confine myself to wheels of any special construction, or to constructing the axle in a single piece, or to constructing and mounting the body of the vehicle strictly as described, as these and other minor features may be varied considerably without departing from the spirit of my improvement.

Having thus explained my invention, what I claim is—

1. The combination, in a tricycle, of a pair of supporting-wheels, an axle to which said wheels are fixed, collets fixed to said axle, provided with recessed bosses, sleeves adapted to turn on said axle, provided at their inner ends with pulleys and at the outer ends with flanges, having pawls on their outer faces adapted to engage said bosses, a steering-wheel, a body provided with a seat, with laterally-extending outriggers, and with laterally-extending brackets, a pair of levers joined to said outriggers, a pair of sheaves or pulleys disposed at the forward end of said body, driving-straps connected, respectively, to the bosses of the sleeves, cords passing over said sheaves, and connected at their opposite ends to said straps and levers, retrieving-straps connected to said sleeves, and contractile springs connecting said retrieving-straps with said brackets, all substantially as described.

2. In a tricycle substantially such as described, the brace g, in combination with the axle E, clutch N, and bolster or axle-bar Y, substantially as set forth.

JOHN F. CUMMING.

Witnesses:
C. A. SHAW,
L. J. WHITE.